United States Patent
Göderer et al.

(10) Patent No.: US 9,835,738 B2
(45) Date of Patent: Dec. 5, 2017

(54) METHOD FOR ACTIVATING AN X-RAY DETECTOR AND ASSOCIATED CONTROL UNIT

(71) Applicant: Siemens Aktiengesellschaft, München (DE)

(72) Inventors: Edgar Göderer, Forchheim (DE); Björn Kreisler, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 207 days.

(21) Appl. No.: 14/639,330

(22) Filed: Mar. 5, 2015

(65) Prior Publication Data

US 2015/0253437 A1  Sep. 10, 2015

(30) Foreign Application Priority Data

Mar. 5, 2014  (DE) .......................... 10 2014 204 042

(51) Int. Cl.
| | |
|---|---|
| G01T 1/17 | (2006.01) |
| G01T 1/24 | (2006.01) |
| G01T 7/00 | (2006.01) |
| G01T 1/40 | (2006.01) |

(52) U.S. Cl.
CPC ............... *G01T 1/241* (2013.01); *G01T 1/17* (2013.01); *G01T 1/247* (2013.01); *G01T 1/40* (2013.01); *G01T 7/005* (2013.01)

(58) Field of Classification Search
None
See application file for complete search history.

(56) References Cited

U.S. PATENT DOCUMENTS

| | | | | | |
|---|---|---|---|---|---|
| 5,198,673 | A | * | 3/1993 | Rougeot | ............... G01T 1/2018 250/370.09 |
| 7,145,986 | B2 | * | 12/2006 | Wear | ....................... G01T 1/366 250/370.09 |
| 7,465,913 | B2 | * | 12/2008 | Chuang | ............. H01L 27/14625 250/208.1 |
| 7,829,860 | B2 | * | 11/2010 | Nygard | ................. G01T 1/2018 250/366 |
| 8,362,412 | B2 | * | 1/2013 | Kubodera | ......... H01L 27/14609 250/208.1 |
| 8,491,190 | B2 | * | 7/2013 | Glasser | ................... G01T 7/005 378/207 |
| 8,530,850 | B2 | * | 9/2013 | Spartiotis | .......... H01L 27/14634 250/370.08 |
| 9,069,088 | B2 | * | 6/2015 | Engel | ...................... G01T 1/241 |
| 9,196,647 | B2 | * | 11/2015 | Senda | ............... H01L 27/14641 |
| 9,261,609 | B2 | * | 2/2016 | Shahar | .................... G01T 1/241 |

(Continued)

FOREIGN PATENT DOCUMENTS

EP  2 584 379 A1  4/2013

*Primary Examiner* — David J Makiya
*Assistant Examiner* — Soorena Kefayati
(74) *Attorney, Agent, or Firm* — Schiff Hardin LLP (57) ABSTRACT

In a method and control unit for activating an X-ray detector, having an X-ray sensitive sensor layer and an arrangement of pixel electrodes connected at the back to the sensor layer, an individually adjusted depletion voltage is applied to each of the pixel electrodes. The value of the depletion voltages applied to different pixel electrodes is chosen to be different such that the effective pixel sizes respectively associated with the pixel electrodes are aligned with each other.

15 Claims, 4 Drawing Sheets

(56) References Cited

U.S. PATENT DOCUMENTS

| | | | |
|---|---|---|---|
| 9,423,515 B2 * | 8/2016 | Roessl | G01T 1/241 |
| 9,472,704 B2 * | 10/2016 | Kreisler | H01L 27/14676 |
| 2007/0290142 A1 * | 12/2007 | Du | G01T 1/241 250/370.09 |
| 2011/0168909 A1 * | 7/2011 | Nakao | G01T 1/247 250/370.09 |
| 2012/0305757 A1 * | 12/2012 | Kappler | G01T 1/40 250/252.1 |
| 2014/0183371 A1 | 7/2014 | Roessl et al. | |
| 2015/0212215 A1 * | 7/2015 | Goderer | G01T 1/24 378/19 |

* cited by examiner

METHOD FOR ACTIVATING AN X-RAY DETECTOR AND ASSOCIATED CONTROL UNIT

BACKGROUND OF THE INVENTION

Field of the Invention

The invention relates to a method for activating an X-ray detector. The invention also relates to a control unit for implementing such a method.

Description of the Prior Art

A basic requirement of X-ray imaging, in particular in the field of computed tomography (CT), is the signal stability and reproducibility. Ideally the X-ray detector should always supply the same measuring result in response to the same input radiation. In reality the detector response is influenced by a number of factors, however. Long-term influencing variables are ageing processes, the radiation dose of the incident X-ray radiation, and varying operating conditions as a result of on/-off switching cycles. An X-ray detector is subject to a short-term (temporary) influence due to the radiation history and as a result of changes in temperature (which may, in turn, be due to radiation). In computed tomography, variations in the detector response (with constant incident X-ray radiation) are usually called "drift".

Detectors known as direct converting, quantum-counting X-ray detectors are increasingly being used, particularly in computed tomography. An X-ray detector of this kind conventionally has an X-ray sensitive sensor layer in which electron-hole pairs are generated by incident X-ray quanta. The radiation-induced electron-hole pairs are separated by applying a depletion voltage. For this purpose, a control electrode extending over the entire detector surface is applied to a front side, usually facing the radiation source, of the sensor layer, and this is connected to a negative electric potential. An arrangement of defined electrodes is disposed on the back of the sensor layer that faces away from the front. These electrodes on the back, of which each generates one pixel of the X-ray image to be recorded, and which are therefore called "pixel electrodes" below, are usually connected to ground.

Under the effect of the depletion voltage, typically on the order of magnitude of 1,000 volts, the "knocked out" electrons drift, due to an X-ray quantum, to one of the pixel electrodes and activate a current pulse there. The term "depletion" in this sense denotes the removal of the radiation-induced free electrons from the sensor layer. The current pulses generated at the individual pixel electrodes are detected as a counting event by an electronic evaluation device connected downstream. The electronic evaluation device usually subjects the peak current of the detected current pulses to a threshold analysis in order to distinguish real, i.e. radiation-induced, counting events from other interference currents. Sometimes the electronic control device carries out a graduated threshold comparison, during the course of which the current pulses are counted according to the current peaks in different channels. Since the current peaks (pulse level) of the radiation-induced current pulses depends on the quantum energy of the detected X-ray quanta, this enables a spectral (i.e. activated according to the frequency or, equally, the quantum energy) detection of the detected X-ray radiation.

In X-ray detectors, in particular X-ray detectors of the type described above, the drift routinely has a spatial distribution over the sensor surface. The detector response is therefore spatially inhomogeneous, with spatial homogeneity of the incident X-ray radiation. The static portion of this spatial inhomogeneity is usually compensated by taking a reference image with homogeneous irradiation and by division by the relative counting rate in conventional computed tomography. This compensation method leaves the causes of the inhomogeneity of the detector response unaffected, however. Furthermore, this method is not suitable for compensation of the short-term drift (i.e. the short-term change over time in the detector response). Instead, this may currently be reduced only by improved sensor materials or by conditioning of the sensor material (for example by means of infrared radiation). These measures are only effective to a limited extent, however, and are often associated with a significant increase in the production and operating costs.

SUMMARY OF THE INVENTION

An object of the invention is to eliminate, or at least reduce, the drift in an X-ray detector, in particular a direct converting, quantum-counting X-ray detector, in a way which can be easily implemented but is still effective.

The invention starts with an X-ray detector having an X-ray sensitive sensor layer and an arrangement of pixel electrodes, wherein radiation-induced charge carriers are removed from the sensor layer under the effect of a depletion voltage. The X-ray detector is preferably a direct converting, quantum-counting X-ray detector of the type mentioned above. The invention may also be applied to other types of detector.

According to the inventive method, the depletion voltage applied to the pixel electrodes is not uniformly adjusted for all pixel electrodes. Instead, this depletion voltage is individually adjusted for each of the pixel electrodes. The depletion voltages applied to the various pixel electrodes are chosen to be different so that the effective pixel sizes respectively associated with the pixel electrodes are aligned with each other, so that, in other words, the effective pixel size for all pixel electrodes of the X-ray detector has at least approximately the same value.

The cross-sectional area of the volume of the sensor layer in which the absorption of an X-ray quantum leads to a current pulse on the relevant pixel electrodes is designated the "effective pixel size" (hereinafter also called "pixel size" for short) associated with a pixel electrode. The effective pixel size can be considered as approximately denoting the sphere of influence of a pixel electrode within the sensor layer. The effective pixel size usually exceeds the area of the associated pixel electrodes, especially since the sphere of influence of each pixel electrode, with the electrical field emanating from it, extends into the gaps formed between the pixel electrodes.

The depletion voltages are preferably adjusted to the pixel electrodes, such as by individual adjustment of the electric (operating) potential of the respective pixel electrodes. The pixel electrodes of the X-ray detector are therefore purposefully connected to (relative to each other) different operating potentials. Conversely, the front of the X-ray detector facing away from the pixel electrodes is preferably (analogously to conventional X-ray detectors) kept at uniform electrical potential by a control electrode that bridges the sensor surface.

The invention starts from the recognition that in the case of X-ray detectors, in particular direct converting, quantum-counting X-ray detectors, a distinction can be made between two causes of the drift that occurs, namely firstly what is known as "spectral squeezing" and secondly what is known as "pixel size drift".

"Spectral squeezing" denotes a change in the form of the current pulse generated on absorption of an X-ray quantum. Therefore the same charge quantity is always released by the absorption of an X-ray quantum with given quantum energy. Depending on the absorption site and distribution of the drift speed of the charge carriers, the current pulse generated by these charge carriers can, however, have a varying width (i.e. duration) and level (current peaks). The spectral squeezing is based here on a change in the field strength curve in the region of what is known as the "weighting field", i.e. of the field in the region of the sensor layer, located in the vicinity of the pixel electrodes, in which the generated signal charge influences the main part of its signal. If the field strength drops here then the drift speed of the charge carriers also drops, so that the influenced pulses become wider. With a threshold comparison calibrated to a certain current peak, as is conventionally carried out by the electronic evaluation device of a quantum-counting X-ray detector, the distribution of the current pulses routinely leads to fewer pulses being counted as counting events.

"Pixel size drift" denotes a change in the effective pixel size. The cause of the pixel size drift is the occurrence of a change in the electric field configuration within the sensor layer, which changes the sphere of influence of the pixel electrodes (i.e. the volume of the sensor layer, from which the resulting charge of the pixel electrodes flows). Since the sensor surface is unchangeable as a whole, an increase in the effective pixel size of a pixel electrode is always at the expense of one or more adjacent pixel electrode(s). Causes of the pixel size drift may be for example an electric charging of drift zones or impurities in the material of the sensor layer. In contrast to spectral squeezing, the rate of the current pulses generated in the relevant pixel electrodes is changed by pixel size drift whereas the current peaks of the individual current pulses remain unaffected by the pixel size drift.

As is known, the cause of the pixel size drift can now be eliminated by the spatial variation in the depletion voltage. The pixel size drift is therefore not just subsequently compensated by signal processing (which always includes a certain risk of error). Instead, the inventive method prevents the pixel size drift as early as at its emergence. The image quality of the X-ray detector is significantly improved by the elimination of this drift fraction.

In an embodiment of the method the depletion voltages respectively applied to the pixel electrodes are not just locally varied (i.e. from pixel electrode to pixel electrode). Instead, the depletion voltage applied to each of the pixel electrodes is preferably also varied over time. The X-ray radiation detected by means of the X-ray detector is used as the input variable here, according to which the depletion voltages are varied from a time perspective. This process is based on the recognition that the pixel size drift definitively depends on the irradiation history of the X-ray detector. As is known, irradiation of the X-ray detector with intensive X-ray radiation leads to inhomogeneities in the spatial distribution of the effective pixel size forming or intensifying, with these inhomogeneities outlasting the activating irradiation phase and decaying only gradually.

In one variant of the method the averaged (spatially and/or over time) intensity of the detected X-ray radiation is used as the input variable for the variation over time in the depletion voltages. Within the context of the invention it is basically conceivable for only the current value of the X-ray intensity to be taken into account. For a more precise adjustment of the depletion voltages, the time curve of the X-ray intensity is preferably also considered, however, for example in that from a number of successively determined values of the averaged X-ray intensity a—preferably weighted—mean or trend is determined and used as the input variable for the variation over time in the depletion voltages.

As an alternative to this, instead of the averaged X-ray intensity the counting rates respectively detected for the individual pixel electrodes are used as the input variables for the variation over time of the respective depletion voltage.

In a particularly advantageous embodiment of the method the functional correlation between the irradiation history and the depletion voltage that is to be adjusted as a function of location are determined by means of a specific calibration process described in more detail below. For this purpose, firstly the X-ray detector is irradiated in a loading phase with homogeneous X-ray radiation of comparatively high intensity. "Homogeneous X-ray radiation" as used herein means X-ray radiation having an intensity and quantum energy distribution (spectral form) are constant over the detector surface. The purpose of this loading phase is the targeted generation of a pixel size drift on the detector surface.

The counting rate is determined several times in a measuring phase that follows the loading phase (i.e. at at least two different measuring instants) with irradiation of the X-ray detector with homogeneous X-ray radiation for each pixel electrode and for at least two spectral ranges. The spectral range associated with a count event is determined by the current peak H of the detected current pulse in each case, which, as described above, correlates with the frequency (and accordingly to the quantum energy) of the absorbed X-ray radiation. In other words, one counting rate spectrum is determined individually for each pixel electrode and each measuring instant (the teen "counting rate spectrum" is also used herein to mean encompass a counting rate spectrum having only two support points).

In a further step of the calibration process, the low-frequency limit value is determined respectively for each counting rate spectrum. "Low-frequency limit value" here designates the counting rate value that the respective counting rate spectrum assumes in extrapolation against decaying frequency or quantum energy or current peak (i.e. for H=0). The support points of the respective counting rate spectrum are preferably adjusted by a linear or polynomial model function (fitted), with the counting rate spectrum then being extrapolated using the adjusted model function against H=0. This low-frequency limit value is used in the course of the calibration process as a measure of the total number of pulses detected by the respective pixel electrode at the respective measuring instant, especially since, as is known, this limit value is unaffected by spectral squeezing and the counting errors cased thereby.

Lastly, a measure of the pixel size drift is calculated for each pixel electrode in the course of the calibration process from at least two low-frequency limit values determined at different measuring instants, in particular by division of these limit values. Using this measure of the pixel size drift, the associated depletion voltage is then determined for the respective pixel electrode during operation of the X-ray detector.

The correlation between the measure of the pixel size drift and the depletion voltage to be respectively adjusted can either be determined empirically within the context of the invention, for example by numerical optimization methods or using the given material constants and the geometric properties of the X-ray detector.

The inventive control unit is generally adapted for implementing the above-described inventive method. It is therefore adapted to apply to each of the pixel electrodes of the X-ray detector to be activated, in particular by individual adjustment of the electric (operating) potential of the respective pixel electrode, an individually adjusted depletion voltage and to choose the depletion voltages to be applied to the various pixel electrodes to be different such that the effective pixel sizes respectively associated with the pixel electrodes are aligned with each other.

The control unit is designed to implement the method in one of the embodiments described above. The above statements about different variants and developments of the method therefore apply to the control unit as well.

The control unit is a physical device in which functions for implementing the method are performed by circuitry and/or programmed components. This control unit preferably includes a non-programmable integrated circuit, of the type known as an ASIC, in which the method or functional components thereof are implemented in terms of circuitry. In addition or as an alternative, the control unit can, within the context of the invention, include a programmable component such as an FPGA (Field Programmable Gate Array) or a microprocessor in which the method or functional components thereof are implemented by a program.

Within the context of the invention the control unit can be produced separately from the X-ray detector to be activated, in particular as an attachment or update kit for an existing X-ray detector. The control unit can, however, also be implemented as a permanent, integrated component of an X-ray detector, so an X-ray detector provided with the control unit constitutes an embodiment of the invention.

DESCRIPTION OF THE PREFERRED EMBODIMENTS

Figure 1:
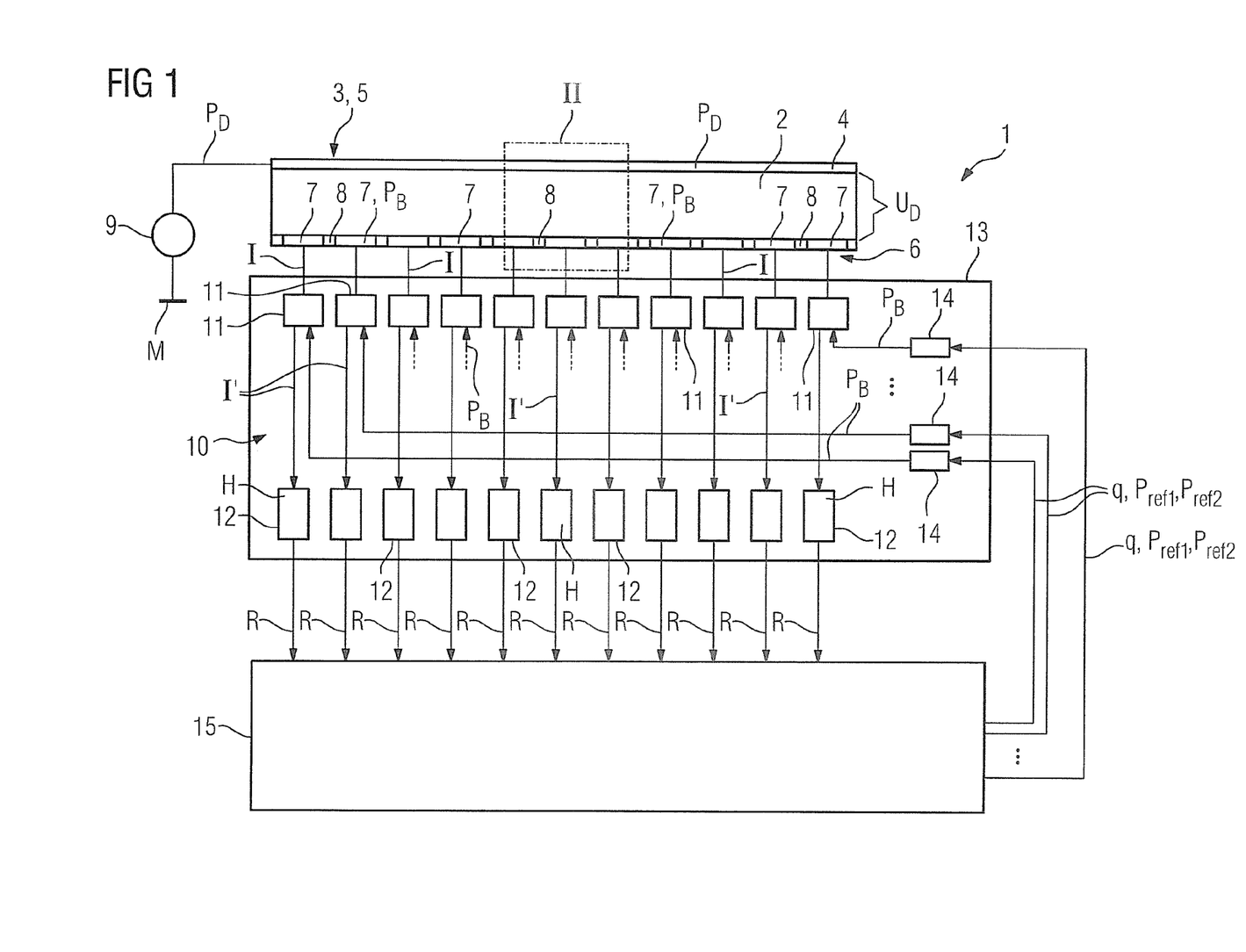
FIG. 1 is a block diagram of an X-ray detector having a sensor layer on whose front a control electrode extending over the entire detector surface is arranged, and on whose back a large number of individual pixel electrodes each with an electronic evaluation device connected downstream are arranged, and an FPGA for activating the X-ray detector.

FIG. 1 shows an X-ray detector 1 that is used, for example, in a medical computed tomography apparatus. The X-ray detector 1 is a direct converting, quantum-counting X-ray detector. The X-ray detector 1 comprises a sensor layer 2 made from an X-ray sensitive, semiconductive material, in particular CdTe (cadmium telluride). The front 3 of the sensor layer 2, which in the intended arrangement of the X-ray detector 1 is associated during operation with an X-ray source (not shown), is provided with a control electrode 4 which extends over the entire detector surface 5, i.e. the front surface of the sensor layer 2. A large number of individual, reciprocally insulated pixel electrodes 7 are arranged on the back 6 of the sensor layer 2 that opposes the front 3. The pixel electrodes 7 are arranged in a two-dimensional, rectangular grid structure (matrix structure) and are spaced apart from each other with the formation of interposed (electrode) gaps 8.

In an exemplary dimensioning the sensor layer 2 has a thickness of 1,600 µm, known as a pixel pitch, i.e. a spacing between the surface centers (center-center spacing) of adjacent pixel electrodes 7, of 250 µm, respectively, and a pixel electrode spacing of 55 µm, respectively.

The control electrode 4 is connected to a (high) voltage source 9. Each of the pixel electrodes 7, on the other hand, is connected downstream of an electronic evaluation device 10. Within the context of the electronic evaluation device 10 a pre-amplifier 11 is connected immediately downstream of each pixel electrode 7. Furthermore, the electronic evaluation device 10 comprises for each pixel electrode 7 a counter circuit 12 connected downstream of the pre-amplifier 11 in each case. In the exemplary embodiment according to FIG. 1 the electronic evaluation device 10 is integrated in an ASIC 13.

During operation of the X-Ray detector 1 the high voltage source 9 applies a negative depletion potential $P_D$ which has for example a value of –900 Volt relative to ground M. The pixel electrodes 7 are kept at operating potentials $P_B$ as described in more detail below, and these vary only slightly, for example vary within an interval [–10V; +10V] around ground M (M=0V). A depletion voltage $U_D$ ($U_D=P_B-P_D$), value of the order of magnitude of 900V, is therefore applied within the sensor layer 2 between the control electrode 4 and each of the pixel electrodes 7.

Figure 2:
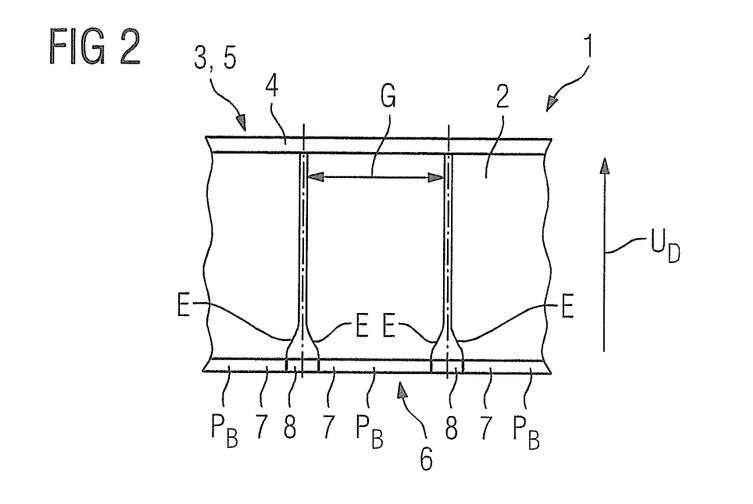
FIG. 2 is an enlarged detailed view II according to FIG. 1, showing the sensor layer of the X-ray detector, with which the undisturbed field configuration of an electric field that builds up under the effect of a depletion voltage inside the sensor layer.

As shown schematically in FIG. 2, an electric field E (only intimated in FIG. 2) builds up within the sensor layer 2 under the effect of the depletion voltage $U_D$. The part of this field E extending between the control electrode 4 and one specific pixel electrode 7 respectively defines a sphere of influence of the respective pixel electrodes 7 insofar as electrons, which are knocked out of their bound state due to absorption of X-ray quanta in this sphere of influence, drift along the field lines of the field E to this pixel electrode 7. The cross-sectional area—measured on or in the vicinity of the front 4 of the sensor layer 2—of this sphere of influence forms a (effective) pixel size G. As may be seen in the view according to FIG. 2, this pixel size G exceeds, at least in the ideal (undisturbed) state of the X-ray detector 1 shown in FIG. 2, the cross-sectional area of the associated pixel electrode 7, especially since the field E, and therefore the sphere of influence of the pixel electrode 7, spread into the region of the adjoining electrode gaps 8.

In the undisturbed state of the X-ray detector 1 according to FIG. 2 the respective spheres of influence of two adjoining pixel electrodes 7 fill the area of the electrode gap 8 therebetween in equal parts. All pixel electrodes 7 have the same pixel size G as a result.

Figure 3:
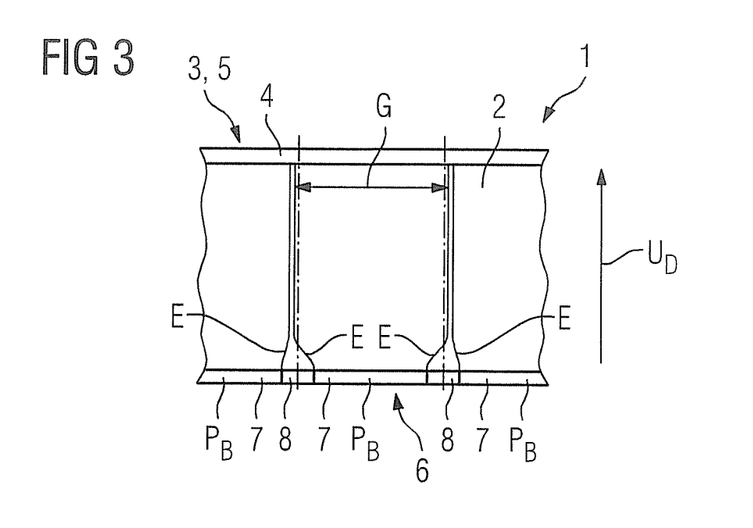
FIG. 3 shows in a view according to FIG. 2 the detail therein through the sensor layer, having a field configuration disturbed by pixel size drift.

As illustrated in FIG. 3, in reality the pixel sizes G of the individual pixel electrodes 7 differ from each other to more or less the same extent, however, due to pixel size drift. An enlargement of the pixel size G of a specific pixel electrode 7 (in the example according to FIG. 3 the middle pixel electrode 7) is inevitably at the expense of the pixel size G of at least one adjoining pixel electrode 7. As is known, such a pixel size drift can be produced by the pixel electrodes 7 being connected to mutually different operating potentials $P_B$. In a reversal of this process, an existing pixel size drift is compensated by individual adjustment of the operating potential $P_B$ for each pixel electrode in the case of the X-ray detector 1. According to FIG. 1, the electrons knocked out on absorption of an X-ray quantum trigger a current pulse I in the pixel electrode 7, in whose sphere of influence the absorption took place. This current pulse I is converted by the downstream pre-amplifier 11 into a current-proportional voltage pulse I. This voltage pulse I' is fed from the pre-amplifier 11 to the downstream counter circuit 12 and leads to a count event here. In the counter circuit 12 the peak current H of the current pulse I (more precisely, the peak of the current-proportional voltage pulse I') is compared with a cascade of a plurality of—for example four—graduated threshold values. If the peak current H attains a predefined minimum level, the current pulse I, depending on the level of the peak current H, is counted as a count event in one of several channels. The counting events are therefore spectrally triggered, i.e. detected as a function of frequency or quantum energy of the detected X-ray quantum.

The above-described pixel size drift leads—with constant intensity of the incident X-ray radiation—to a change in the counting rate which is proportional to the change in the effective pixel size G. To eliminate the pixel size drift or to at least largely reduce it, the operating potentials $P_B$ for each pixel electrode 7 are individually adjusted by means of a respectively associated adjustment circuit 14 (FIG. 1). The pixel electrodes 7 are therefore usually kept at slightly different operating potentials $P_B$, so the depletion voltage $U_D$ for the various pixel electrodes 7 is also slightly different. The operating potential $P_B$ is fed here to the respective pixel electrode 7 via the associated pre-amplifier 11.

The adjustment circuits 14—likewise integrated in the ASIC 13 in the example according to FIG. 1—are controlled by an FPGA 15 (i.e. a Field Programmable Gate Array) with a uniform manipulated variable q for all adjustment circuits 14.

The FPGA 15 is connected downstream of the electronic evaluation device 10 and receives therefrom the counting rates R for the individual pixel electrodes 7, emitted by the counter circuit 12, as input variables. From this the FPGA 15 calculates in a manner described below the control signal q for the adjustment circuits 14.

Figure 4:
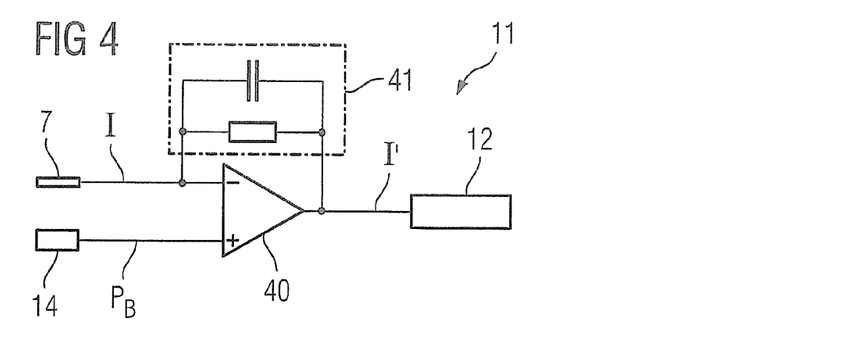
FIG. 4 shows in an electric circuit diagram a pre-amplifier of the electronic evaluation device of the X-ray detector according to FIG. 1 respectively associated with each pixel electrode.

FIG. 4 shows an exemplary embodiment of one of the pre-amplifiers 11. The pre-amplifier 11 is designed here as a transimpedance amplifier. In this embodiment the pre-amplifier 11 comprises an operational amplifier 40 whose inverting input (−) is back-coupled by a back coupling circuit 41 to the output. The inverting input of the operational amplifier 40 is connected to the associated pixel electrode 7. The non-inverting input (+) of the operation amplifier 21, by contrast, is connected to the adjustment circuit 14 to supply the operating potential $P_B$. The output of the operation amplifier 40 is connected to the associated counter circuit 12.

Figure 5:
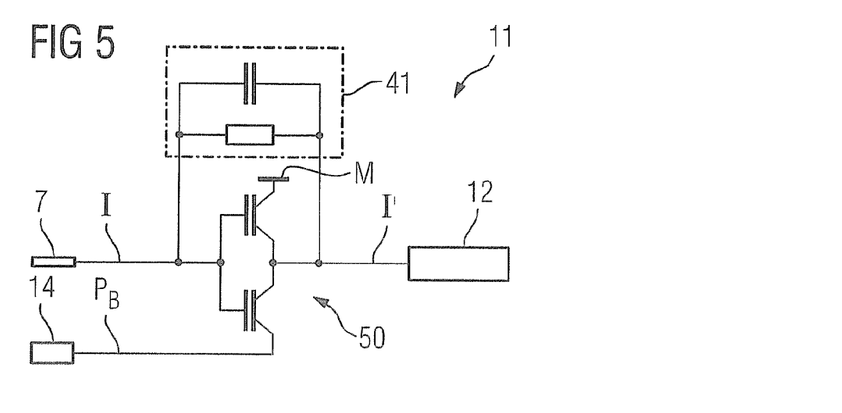
FIG. 5 shows in a view according to FIG. 4 an alternative embodiment of the pre-amplifier.

FIG. 5 shows an alternative embodiment of the pre-amplifier 11. This embodiment of the pre-amplifier 11 differs from the embodiment according to FIG. 4 in that the operation amplifier 40 is replaced by a complementary metal-oxide semiconductor (CMOS 50). The pixel electrode 7 is connected to the input of the CMOS 50, while the counter circuit 12 is connected to the output of the CMOS 50. The adjustment circuit 14 is connected to the negative supply voltage terminal (VSS) of the CMOS 50 to supply the operating potential $P_B$.

The control signal q output by the FPGA 15 to the adjustment circuit 14 can vary—continuously or discontinuously in several stages—between two limit values, e.g. between 0 and 1. The respective adjustment circuit 14 varies the operating potential $P_B$ for the associated pixel electrodes 7 in particular according to a linear equation $$P_B = q \cdot P_{ref1} + (1-q) \cdot P_{ref2} \quad \text{EQU 1}$$

between two predefined reference potentials $P_{ref1}$ and $P_{ref2}$.

Figure 6:
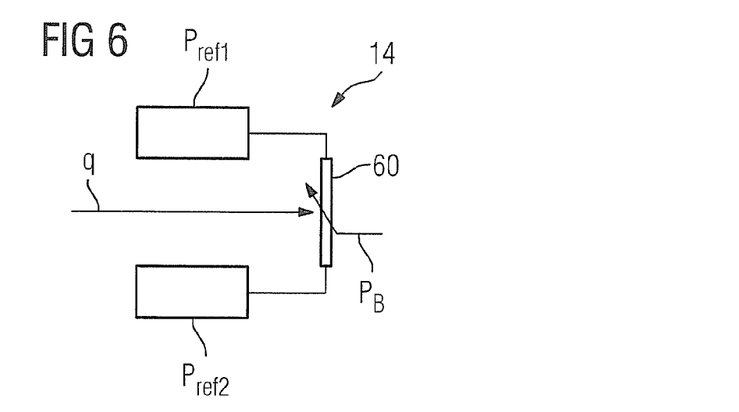
FIG. 6 is a schematic circuit diagram of a voltage divider respectively associated with each pixel electrode for variable adjustment of the operating potential for the respective pixel electrode.

According to FIG. 6, each of the adjustment circuits 14 is formed by a voltage divider 60 to which the reference potentials $P_{ref1}$ and $P_{ref2}$—individually determined for each pixel electrode 7—are applied, and whose division ratio can be automatically varied according to the manipulated variable q.

Figure 7:
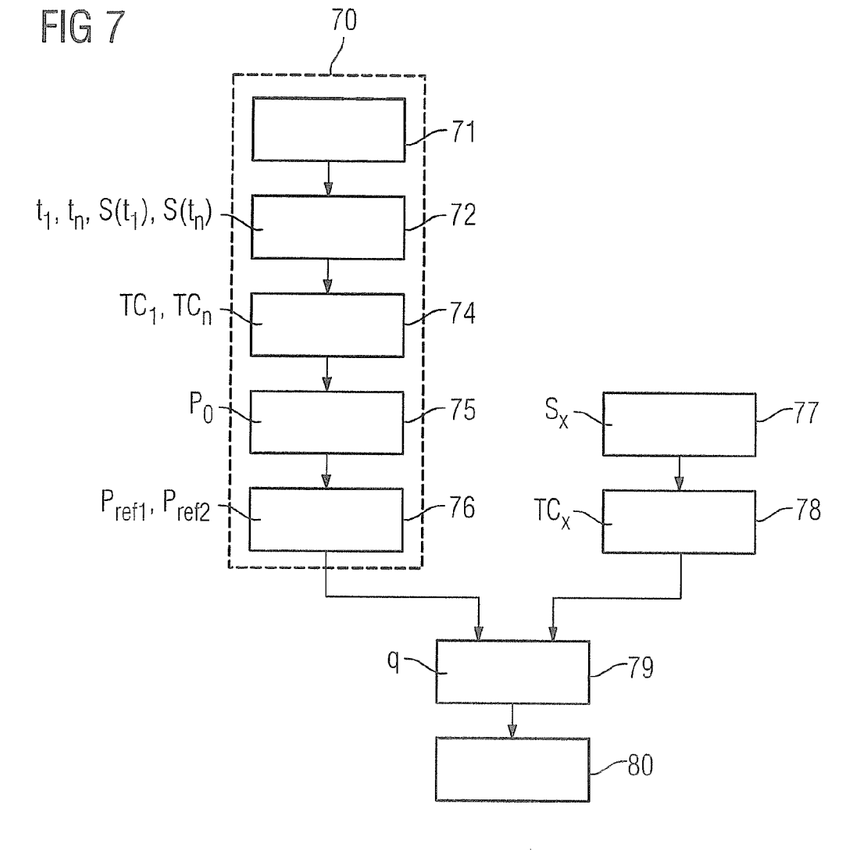
FIG. 7 is a flowchart of an embodiment of the method for determining and adjusting the operating potentials of the pixel electrodes.

The reference potentials $P_{ref1}$, $P_{ref2}$ and the manipulated variable q are determined by the FPGA 15 according to a method illustrated in more detail in FIG. 7.

Operation of the X-ray detector 1, i.e. the intended operation of the X-ray detector 1 for recording medical X-ray images, is preceded by a calibration process 70. During the course of this calibration process 70, the X-ray detector 1 is firstly irradiated during a loading phase 71 for a predefined period with homogeneous X-ray radiation of a comparatively high intensity. With respect to duration and intensity the X-ray radiation is such that the stressing of the X-ray detector 1 caused as a result roughly matches the anticipated maximum stress during operation of the X-ray detector 1.

A measuring phase 72 follows the loading phase 71, in which the counting rates R are repeatedly determined in a spectrally resolved manner with irradiation of the X-ray detector 1 with homogeneous X-ray radiation for each pixel electrode 7. In the measuring phase 72 at least one first measurement is carried out at instant $t_1$ immediately after the end of the loading phase 71 and a second measurement is carried out at an instant $t_n$ at the end of the measuring phase 72. The duration of the measuring phase 72, and therefore the interval between the instants $t_1$ and $t_n$ is chosen in such a way that it roughly matches the anticipated regeneration phase of the sensor layer 2 after the loading phase 71. The counting rates R with a fully loaded X-ray detector 1 are therefore determined at measuring instant $t_1$ whereas the counting rates R with a regenerated X-ray detector 1 are measured at measuring instant $t_n$.

During measuring phase 72 the X-ray detector 1 is only irradiated discontinuously with X-ray radiation at the measuring instants $t_1$ and $t_n$, with this X-ray radiation at the two measuring instants $t_1$ and $t_n$ having the same and, compared to the X-ray radiation applied during the loading phase 71, significantly lower intensity.

Figure 8:
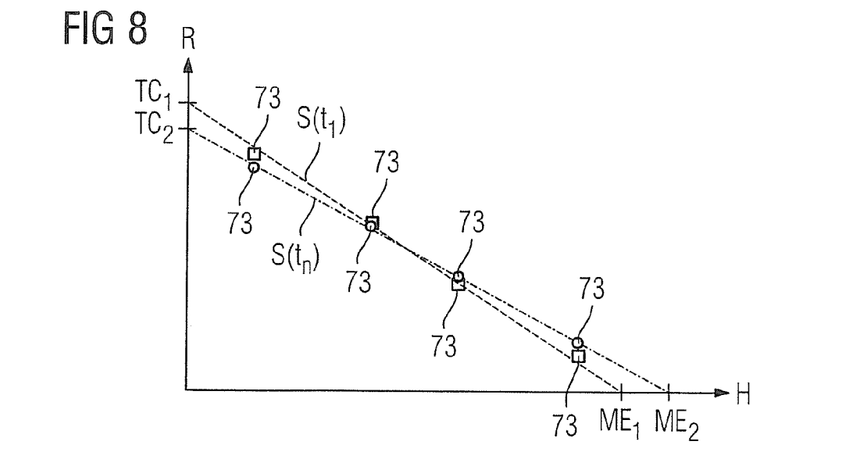
FIG. 8 is a graph of the counting rate versus the current peaks of the current pulses detected at a pixel electrode two counting rate spectra recorded during the course of the method according to FIG. 7.

In accordance with the spectral resolution of the counter circuits 12, the electronic evaluation device 10 supplies the FPGA 15 with one tuple respectively of four counting rate values for each pixel electrode 7 and at each of the two measuring instants $t_1$ and $t_n$, with a specific spectral range (and accordingly a specific current peak H) being associated with each counting rate value—as described above. Each of these counting rate values can therefore be depicted as a support point 73 (FIG. 8) of a counting rate spectrum $S(t_1)$ or $S(t_n)$. FIG. 8 shows a schematic example of the two counting rate spectra $S(t_1)$ and $S(t_n)$ recorded for a specific pixel electrode 7 at the measuring instants $t_1$ and $t_n$. The support points 73 of the spectrum $S(t_1)$ are shown here by square symbols whereas the support points 73 of the counting rate spectrum $S(t_n)$ are shown by circular symbols.

It can be seen in FIG. 8 that the value of the counting rate spectra $S(t_1)$ and $S(t_n)$ decreases monotonously as the current peak H increases (and accordingly increasing quantum energy). The counting rate spectra $S(t_1)$ and $S(t_n)$, which can be detected by means of X-ray detector 1, differ from the spectrum of the incident X-ray radiation in that the counting rate spectra are routinely shifted to lower energy values. This is due firstly to the spectral squeezing described in the introduction and secondly to the fact that the charge generated by an X-ray quantum is sometimes divided among two or more adjacent pixel electrodes 7, so even relatively small amounts of energy, which significantly fall below the quantum energy absorbed X-ray quanta, are detected by the pixel electrodes 7.

In a method step 74 (FIG. 7) that follows the measuring phase 72 each of the two counting rate spectra $S(t_1)$ and $S(t_n)$ is now linearly adjusted (fitted) by the FPGA 15. Using this adjustment, the FPGA 15 determines the respective low-energy limit value $TC_1$ or $TC_n$ (FIG. 8) for each of the counting rate spectra $S(t_1)$ and $S(t_n)$. In this case "low-energy limit value" $TC_1$ or $TC_n$ designates the counting rate value which the respective counting rate spectrum $S(t_1)$ or $S(t_n)$ assumes in the extrapolation at decaying energy levels (H=0) ($TC_1 = S(t_1)|_{H=0}$; $TC_n = S(t_n)|_{H=0}$). The limit value $TC_1$ or $TC_n$ determined in this way is used within the course of the method as a measure of the total number of X-ray quanta absorbed in the sphere of influence of the respective pixel electrode 7 at the respective measuring instant $t_1$ or $t_n$ since this limit value $TC_1$ or $TC_n$ is largely unaffected by spectral squeezing.

As is known, spectral squeezing in the counting rate spectra $S(t_1)$ and $S(t_n)$, by contrast, crucially manifests itself in the position of the respective zero point $ME_1$ or $ME_n$ (FIG. 8).

In a subsequent method step 75 (FIG. 7) of the calibration process 70 the FPGA 15 determines for each pixel electrode 7 a measure of the pixel drift, which is called the pixel drift level $P_0$ below, from the limit values $TC_1$ and $TC_n$ determined beforehand:

$$P_0 = \frac{TC_1}{TC_n} \qquad \text{EQU 2}$$

The pixel drift levels $P_0$ determined for the individual pixel electrodes 7 produce a pixel drift pattern which reflects the spatial distribution of the effective pixel size G in the fully loaded state of the X-ray detector 1. The pixel drift levels $P_0$ determined for the pixel electrodes 7 are stored in the FPGA 15 for use during operation of the X-ray detector 1, for example in the form of a vector, which includes the associated pixel drift level $P_0$ for each pixel electrode 7 as a vector input $[P_0]_i$. The variable i (where i =1, 2, . . . , m) denotes a count variable which identifies the respective pixel electrode 7.

In a method step 76 the FPGA 15 determines values for the reference potentials $P_{ref1}$ and $P_{ref2}$ for each pixel electrode 7.

The reference potential $P_{ref2}$ is associated with the unloaded state of the X-ray detector 1 in which the pixel size drift is only slightly noticeable. In a simple manifestation of the method the reference potential $P_{ref2}$ can therefore be specified as constant for all pixel electrodes 7 (in particular with the value $P_{ref2}=0$). Preferably, however, the FPGA 15 determines the reference potential $P_{ref2}$ using the limit values $TC_n$ determined for the measuring instant $t_n$ for the individual pixel electrodes 7. The FPGA 15 determines the reference potentials $P_{ref2}$ for the individual pixel electrodes 7 in such a way that the spatial differences between these limit values $TC_n$ are compensated, for example according to $$P_{ref2} = -C_1 \cdot (TC_n) \qquad \text{EQU 3}$$

The reference potential $P_{ref1}$ is determined by the FPGA 15 according to a stored functional dependency of the pixel drift level $P_0$, in particular according to the equation $$P_{ref1} = P_{ref2} - C_2 \cdot P_0 \qquad \text{EQU 4}$$

The variables $C_1$ and $C_2$ in EQU 3 and 4 denote proportionality constants which are determined by empirical experiments, in particular the use of a numerical optimization method, or are calculated using the material properties and geometric dimensions of the sensor layer 2 and pixel electrodes 7.

The values of the reference potentials $P_{ref1}$ and $P_{ref2}$ calculated according to EQU 3 or 4 are transferred by the FPGA 15 to the adjustment circuits 14 and stored there.

During operation of the X-ray detector 1 an X-ray image is recorded in a method step 77 by the X-ray detector 1. A counting rate spectrum $S_x$ is determined for each pixel of this X-ray image analogously to the procedure in the measuring phase 72. By adjusting, again linearly this counting rate spectrum $S_x$ and extrapolation of the adjusted spectrum against decaying energy (H=0) the low-energy limit value $TC_x$ is determined from this counting rate spectrum $S_x$ in a method step 78 for each pixel electrode 7. The limit values $TC_x$ determined for the individual pixel electrodes 7 are combined by the FPGA 15 for example into a vector with vector inputs $[TC_x]_i$ (where i=1, 2, . . . , m), with the count variable i in turn denoting the respective pixel electrode 7.

In a method step 79 the FPGA 15 determines by scalar multiplication the vector inputs $[P_0]_i$ and $[TC_x]_i$ the manipulated variable q:

$$q = A \cdot \Sigma_{i=1}^{m}([P_0]_i \cdot [TC_x]_i) - B \qquad \text{EQU 5}$$

The variables A and B are standardization constants which are chosen such that in the borderline case $TC_x = TC_1$ the manipulated variable q assumes the value 1, and in the borderline case $TC_x = TC_n$ the value 0.

Since the recorded X-ray image is influenced by the unknown, variable structure of the examined object, the scalar product can be subject to significant variations. To lessen these variations the scalar product is preferably smoothed by filtering (e.g. averaging). In addition or as an alternative to this, formation of the scalar product can be numerically simplified by not taking into account all pixels, but only selected pixels, preferably edge pixels which are unlikely to be influenced by the object to be examined.

In a subsequent method step 80 the FPGA 15 transmits the manipulated variable q to the adjustment circuits 14, which in turn adjust the operating potential $P_B$ according to EQU 1 for the respectively associated pixel electrode 7.

In the illustrated exemplary embodiment the inventive control unit is formed by the combination of the ASIC 13 and FPGA 15.

Differences in the effective pixel size G of the individual pixel electrodes 7 are dynamically compensated by the different operating potentials $P_B$.

In a variant of the method (not shown) the behavior over time on build-up and decaying of a pixel size drift due to loading is determined by the FPGA 15.

For this purpose, during the course of a modified calibration process the X-ray detector 1 is irradiated in a plurality of loading phases with different X-ray intensity and/or irradiation duration, with the pixel drift level $P_0$ being determined in a measuring phase respectively following each loading phase, analogously to FIG. 7. The dependency of the pixel drift level $P_0$ on the intensity RI and duration RT of the irradiation is preferably modeled by an exponential enhancement model with adjusted time constant $\tau 1$:

$$P_0(RI,RT)=P_0^* \cdot (1-e^{-t/\tau 1}) \qquad \text{EQU 6}$$

Furthermore, at least three measurements respectively are implemented at measuring instants $t_1, t_2, \ldots, t_n$ in the measuring phases, by means of which the decay behavior is modeled by an exponential decay model with adjusted time constants $\tau 2$:

$$P(t)=P_0(RI,RT) \cdot e^{-1/\tau 2} \qquad \text{EQU 7}$$

The corresponding parameters are stored by the FPGA 15 for operation.

During operation of the X-ray detector 1 the FPGA 5 registers the course of the X-ray intensity during the image recording. Using the duration of the image recording and the X-ray intensity averaged over time, the FPGA 15 determines for each pixel electrode 7 the load-dependent pixel drift level $P_0(RI,RT)$ according to EQU 6. At the beginning of the following image recording the FPGA 15 determines the remaining pixel size drift P(t) according to EQU 7 and using the time that has elapsed during the pause in recording. The FPGA 15 determines the value of the operating potential $P_B$ to be adjusted in each case according to the remaining pixel size drift P(t) analogously to EQU 4, and controls the adjustment circuits 14 accordingly.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for activating an X-ray detector comprising an X-ray sensitive semiconductor sensor layer that produces charge carriers in response to incident x-rays according to a charge carrier behavior of said sensor layer that changes over time, said sensor layer having a front side on which X-ray radiation is incident and having a back side to which an arrangement of pixel electrodes is connected, each of said pixel electrodes defining a respective pixel having an effective pixel size that is dependent on said charge carrier behavior of said sensor layer, said method comprising:
    applying an individual depletion voltage to each of said pixel electrodes; and
    for each of said pixel electrodes, individually determining a respective voltage to be applied to that respective pixel electrode, so different respective values of respective depletion voltages are applied individually to different pixel electrodes, with each depletion voltage being individually determined in order to compensate said change over time in said charge carrier behavior, and applying the individually determined depletion voltage to the respective pixel electrode for which that depletion voltage was determined in order to thereby change the effective pixel size of the respective pixel defined by that respective pixel electrode, and thereby aligning the respective effective pixel sizes defined by the different pixel electrodes with each other.

2. A method as claimed in claim 1 comprising placing all of said pixel electrodes at an electric potential, and individually adjusting the depletion voltages for the respective pixel electrodes by individually adjusting the electric potential applied to the respective pixel electrodes.

3. A method as claimed in claim 1 comprising individually adjusting the respective depletion voltages applied to the respective pixel electrodes over time as a function of X-ray radiation detected by said X-ray detector.

4. A method as claimed in claim 3 wherein the detected X-ray radiation has a time curve of intensity, and comprising individually adjusting the respective depletion voltages applied to the respective pixel electrodes dependent on said time curve of intensity.

5. A method as claimed in claim 3 wherein said X-ray radiation detected by said X-ray detector has an average intensity, and individually adjusting the respective depletion voltages of the respective pixel electrodes dependent on said average intensity.

6. A method as claimed in claim 3 comprising detecting said X-ray radiation according to a respective counting rate of each pixel electrode, and varying the respective depletion voltages applied to the respective pixel electrodes over time dependent on the respective counting rates.

7. A method as claimed in claim 6 comprising calibrating said X-ray detector in a calibration procedure comprising:
    irradiating said X-ray detector in a loading phase of said calibration procedure with homogeneous X-ray radiation at a first intensity;
    determining a counting rate spectrum, comprised of at least two spectral values, after said loading phase at at least two measuring points in time while irradiating said X-ray detector with homogeneous X-ray radiation at a second intensity at each pixel electrode that is lower than said first intensity;
    for each pixel electrode, determining a low-frequency limit value of said counting rate spectrum for each pixel electrode at each point in time;
    measuring a drift of the respective pixel size for each pixel electrode from said at least two low-frequency limit values determined at said different measuring points in time; and
    for each pixel electrode, determining the depletion voltage applied thereto using said measure of said drift of the effective pixel size.

8. A control computer for activating an X-ray detector comprising an X-ray sensitive semiconductor sensor layer that produces charge carriers in response to incident x-rays according to a charge carrier behavior of said sensor layer that time-dependently changes, said sensor layer having a front side on which X-ray radiation is incident and having a back side to which arrangement of pixel electrodes is connected, each of said pixel electrodes defining a respective pixel having an effective pixel size that is dependent on said charge carrier behavior of said sensor layer, said control computer comprising:
    an interface that applies an individual depletion voltage to each of said pixel electrodes; and
    said control computer being configured for each of said pixel electrodes, to individually determine a respective depletion voltage to be applied to that respective pixel electrode, so different respective values of respective depletion voltages are applied individually to different pixel electrodes, with each depletion voltage being determined so as to compensate said change over time in said charge carrier behavior, and to apply the individually determined depletion voltage to the respective pixel electrode for which that depletion voltage was determined in order to thereby change the effective pixel size of the respective pixel defined by that respective pixel electrode, and thereby aligning the respective effective pixel sizes defined by the different pixel electrodes with each other.

9. A control computer as claimed in claim 8 wherein said interface places all of said pixel electrodes at an electric potential, and wherein said control computer is configured to individually adjust the depletion voltages for the respective pixel electrodes by individually adjusting the electric potential applied to the respective pixel electrodes.

10. A control computer as claimed in claim 8 wherein said control computer is configured to individually adjust the respective depletion voltages applied to the respective pixel electrodes over time as a function of X-ray radiation detected by said X-ray detector.

11. A control computer as claimed in claim 10 wherein the detected X-ray radiation has a time curve of intensity, and wherein said control computer is configured to individually adjust the respective depletion voltages applied to the respective pixel electrodes dependent on said time curve of intensity.

12. A control computer as claimed in claim 10 wherein said X-ray radiation detected by said X-ray detector has an average intensity, and wherein said control computer is configured to individually adjust the respective depletion voltages of the respective pixel electrodes dependent on said average intensity.

13. A control computer as claimed in claim 10 wherein said control computer is configured to operate said X-ray detector to detect said X-ray radiation according to a respective counting rate of each pixel electrode, and wherein said control computer is configured to vary the respective depletion voltages applied to the respective pixel electrodes over time dependent on the respective counting rates.

14. A control computer as claimed in claim 13 wherein said control computer is configured to calibrate said X-ray detector in a calibration procedure comprising:

irradiating said X-ray detector in a loading phase of said calibration procedure with homogeneous X-ray radiation at a first intensity;

determining a counting rate spectrum, comprised of at least two spectral values, after said loading phase at at least two measuring points in time while irradiating said X-ray detector with homogeneous X-ray radiation at a second intensity at each pixel electrode that is lower than said first intensity;

for each pixel electrode, determining a low-frequency limit value of said counting rate spectrum for each pixel electrode at each point in time;

measuring a drift of the respective pixel size for each pixel electrode from said at least two low-frequency limit values determined at said different measuring points in time; and for each pixel electrode, determining the depletion voltage applied thereto using said measure of said drift of the effective pixel size.

15. An X-ray detector system comprising:

an X-ray detector comprising an X-ray sensitive semiconductor sensor layer that produces charge carriers in response to incident x-rays according to a charge carrier behavior of said sensor layer that time-dependently changes, said sensor layer having a front side on which X-ray radiation is incident and having a back side to which arrangement of pixel electrodes is connected, each of said pixel electrodes defining a respective pixel having an effective pixel size that is dependent on said charge carrier behavior of said sensor layer;

a control computer;

said control computer comprising an interface that applies an individual time-dependent depletion voltage to each of said pixel electrodes; and said control computer being configured, for each of said pixel electrodes, to individually determine a respective depletion voltage to be applied to that respective pixel electrode, so different respective values of respective depletion voltages are applied individually to different pixel electrodes, with each depletion voltage being determined so as to compensate said change over time in said charge carrier behavior, and to apply the individually determined depletion voltage to the respective pixel electrode for which that depletion voltage was determined in order to thereby change the effective pixel size of the respective pixel defined by that respective pixel electrode, and thereby aligning the respective effective pixel sizes defined by the different pixel electrodes with each other.

* * * * *